Oct. 26, 1954   T. F. STACY   2,692,407
MOLDING PRESS WITH TILTING PRESS PLATE
Filed Aug. 1, 1951   4 Sheets-Sheet 3
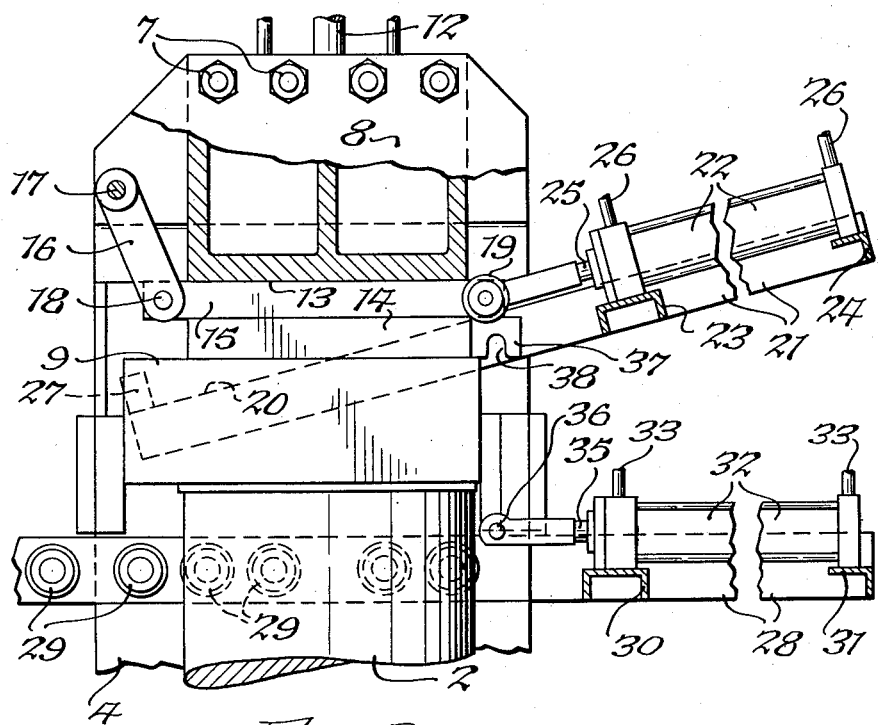
Fig. 3.
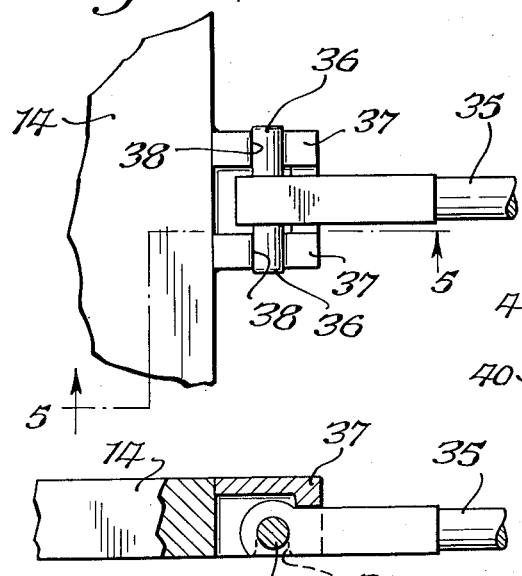
Fig. 4.
Fig. 5.
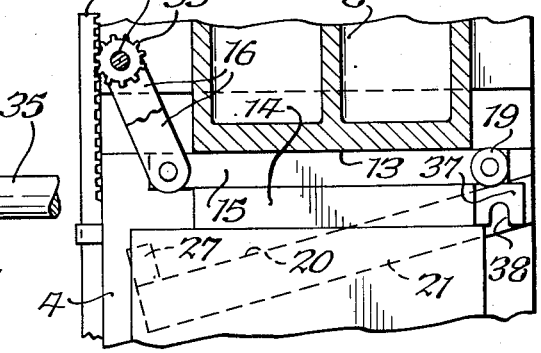
Fig. 6.
Fig. 7.
INVENTOR.
Thomas F. Stacy,
BY
Parker, Prochnow Harmer,
Attorneys.

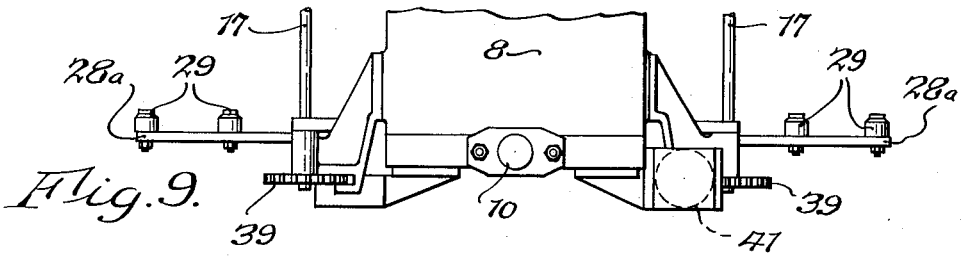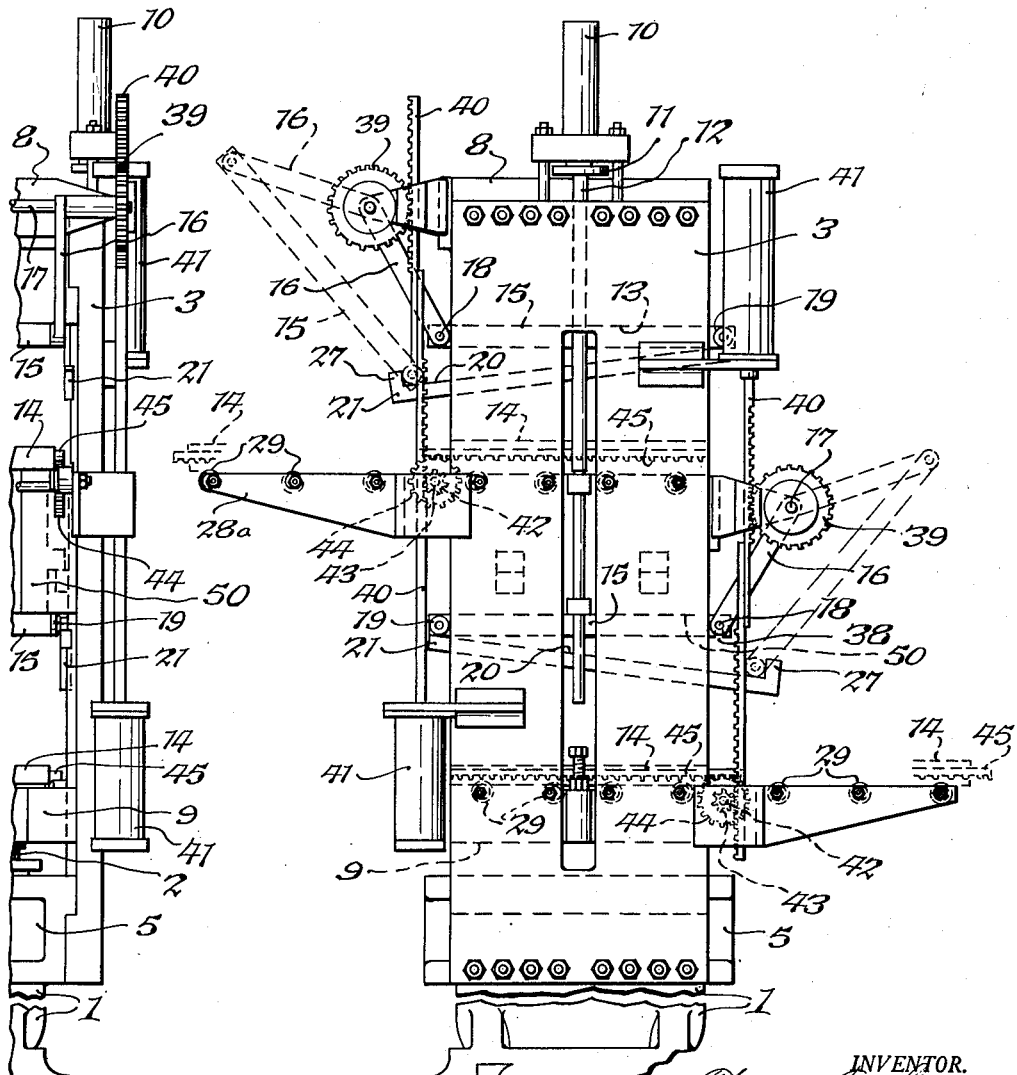

Patented Oct. 26, 1954

2,692,407

UNITED STATES PATENT OFFICE 2,692,407

MOLDING PRESS WITH TILTING PRESS PLATE

Thomas F. Stacy, Piqua, Ohio, assignor to The French Oil Mill Machinery Company, Piqua, Ohio Application August 1, 1951, Serial No. 239,824

16 Claims. (Cl. 18—16)

This invention relates to molding presses, and particularly to those of the type having a sliding lower die or pressing plate and a tilting top die or pressing plate. There are certain definite advantages in having a molding press so built that the operator can observe both the top and bottom dies or plates of the mold in order to install inserts, to keep the molds clean, to easily remove the molded parts, and to easily recharge the mold cavities.

An object of the invention is to improve and simplify the construction and operation of molding presses.

Another object of the invention is to provide an improved molding press in which the dies or press plates may be shifted out of molding position into positions easily accessible for installing inserts, cleaning the molds, removing molded parts and placing fresh charges of molded material in the mold cavities; with which the movement of the dies or pressing plates into and out of pressing position will require a minimum of time and effort; with which both pressing faces of the dies or press plates will be accessible at the same side of the presses; which will be strong, sturdy, compact, durable and inexpensive in construction.

Various other objects and advantages will be apparent from the following description of several embodiments of the invention, and the novel features will be particularly pointed out hereinafter in connection with the appended claims.

In the accompanying drawings:

Fig. 3 is a side elevation, similar to Fig. 1, of the upper part of the press with the parts in pressing position;

Fig. 4 is a bottom plan of a portion of the same to show the coupling between the lower die and its operating air cylinder;

Fig. 5 is a sectional elevation of the parts shown in Fig. 4, the section being taken approximately along the line 5—5, Fig. 4;

Fig. 6 is a side elevation, partly in section, of the upper part of the press, also constructed in accordance with the invention, but illustrating a modification thereof, the press being in the pressing position similar to that of Fig. 3;

Fig. 7 is a side elevation of the air cylinder for operating the upper press plate according to the embodiment shown in Fig. 6;

Fig. 8 is a side elevation of a press also constructed in accordance with the invention but illustrating a further modification thereof;

Fig. 9 is a top plan of a part of the same, and

Fig. 10 is a front elevation of the part of the same as shown in Fig. 9.

Figure 1:
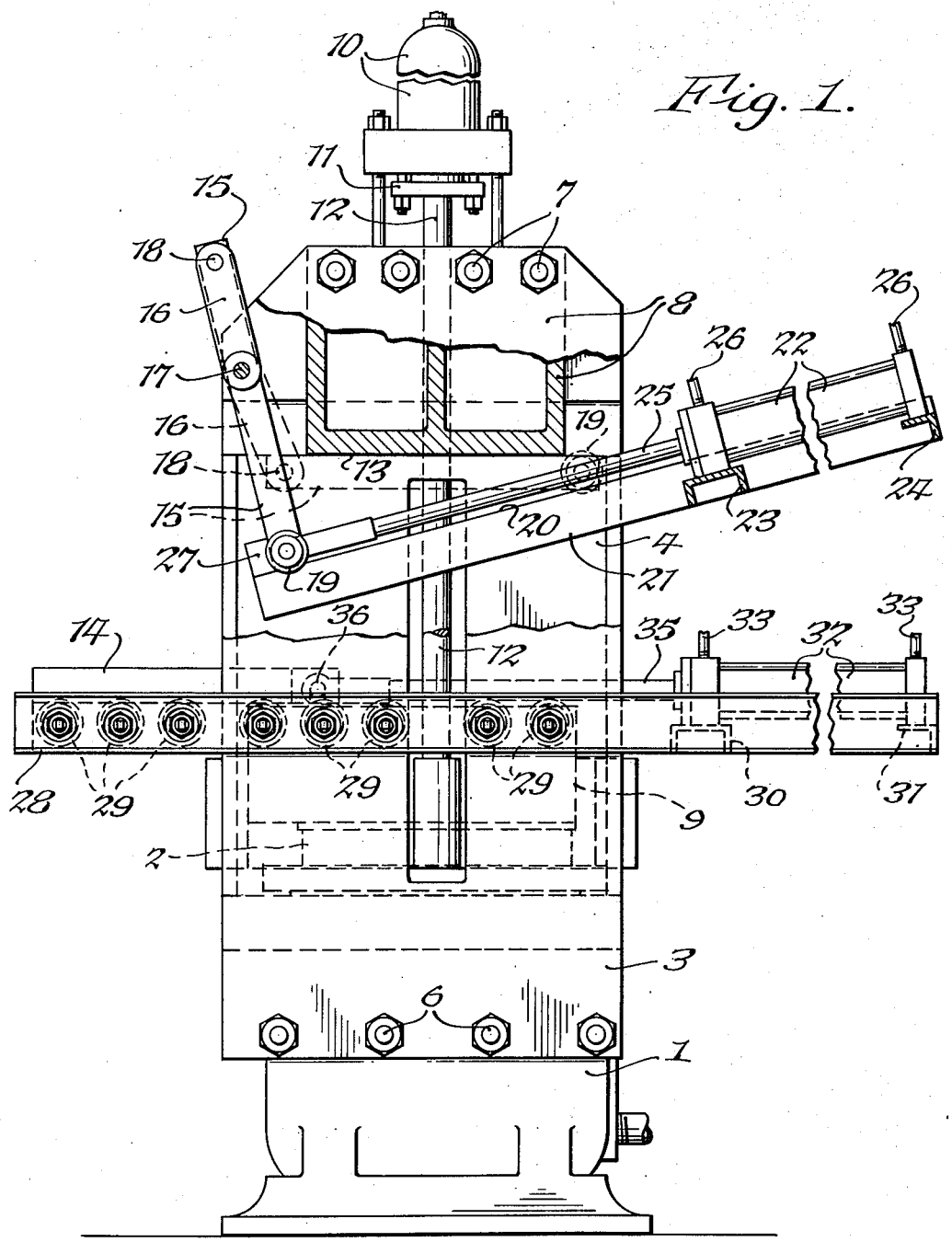
Fig. 1 is a side elevation, partly in section, of a molding press constructed in accordance with this invention.
Figure 2:
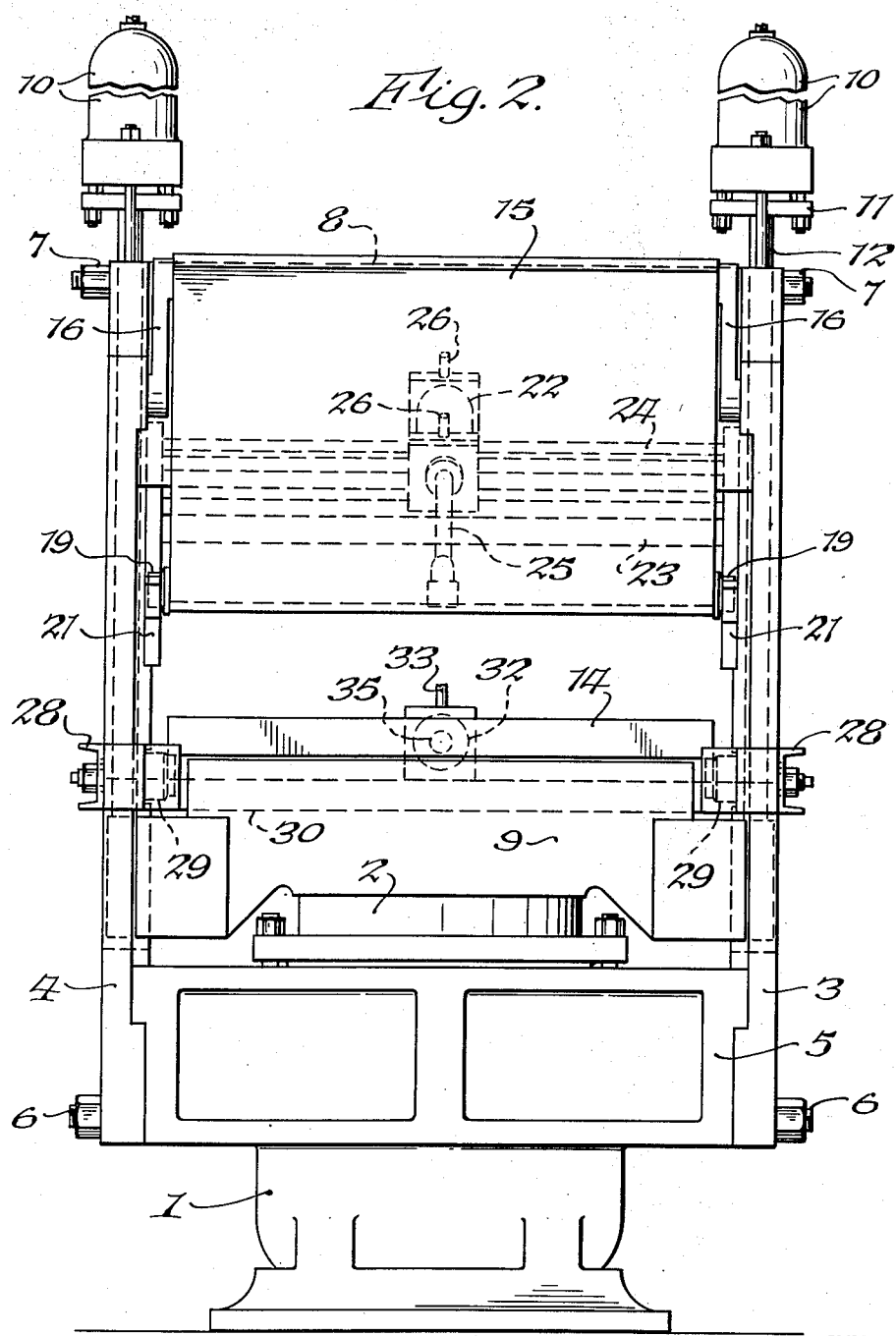
Fig. 2 is a front elevation of the same.

In the embodiment of the invention illustrated in Figs. 1-5, the press includes a base 1 having incorporated therein a large, hydraulic ram cylinder, in the open top of which a main ram or piston 2 reciprocates. Heavy metal plates 3 and 4, Fig. 2, are secured to opposite sides of a frame 5 that forms an encircling part of the base 1, in any suitable manner, such as by welding or by bolts or screws 6. These plates 3 and 4 extend upright from the base in parallel, spaced relation and are suitably secured, such as by screws 7, Fig. 1, to opposite sides of a press head 8. Guided by the side plates and disposed between them is a platen 9 which rests upon the upper end of the ram 2, so as to be raised and lowered therewith as it is guided on the side plates. Push back rams 10 are mounted at the top of the press adjacent the side plates in any suitable manner, and each push back ram has in one end a gland 11 through which a piston rod 12 extends downwardly and is connected at its lower end to the platen. This is a typical side plate, hydraulic press in which, a hydraulic liquid when admitted to the lower end of the hydraulic cylinder in the base 1, causes the ram 2 to move upwardly and shift the platen 9 toward the pressing face 13 of the press head 8. During the ascent of the platen, the push back rods 12 are elevated. When the press is to be opened, the liquid is released from the ram cylinder in base 1, and hydraulic pressure is added to the upper end of each cylinder 10 so as to force the push back rams downwardly and through the rods 12 force the platen 9 downwardly and through it cause the ram 2 to descend. Any suitable hydraulic control system may be employed for controlling the activity of the main ram 2 and the push back cylinders 10.

A lower press plate or die 14 rests above the platen 9 for vertical movement therewith toward and from the pressing face 13 of the press head 8. An upper die or upper press plate 15 is disposed in abutting relation to the pressing face 13 and mounted in a manner which will now be described.

A pair of links 16 are hinged through pivot pins 17 to the side plates of the press, at the tops thereof, for swinging movement. These pins 17 are horizontal and above the plane of the pressing face 13 of the press head. There is one link 16 at each side of the press, and each link at its free end is pivoted by a pin 18, Fig. 1, to the sides or ends of the upper press plate 15, adjacent its forward edge, as shown in Fig. 2. The links 16 thus serve to swingingly support the forward portion of the press plate or die 15. The press plate or die 15 is provided also at each side or end, but adjacent the rear edge, with rollers 19, one at each side, which are guided on tracks 20 provided in frames 21 that are secured to the inside faces of the side plates 3 and 4. The tracks 20 are inclined downwardly and forwardly, so that when the press plate 15 is abutting flat against the under face 13 of the press head 8, as shown in Fig. 3, the roller 19 will beat the rear and highest part of the track 20 at that side of the press, and at the same time the links 16 will be inclined downwardly and rearwardly, that is rearwardly of a vertical plane through the pivots 17. From this it will be observed that the upper die or plate 15 is free to move downwardly and forwardly, because the pivotal connecting pins 18 will move downwardly slightly at the beginning of their forward movement so as to lower the plate 15 from the pressing face 13 and provide clearance, and at the same time the movement of the rollers 19 down the tracks 20 will similarly carry the rear part of the plate 15 downwardly and forwardly. As this forward and downward movement continues, the rollers 19 will continue to lower the rear edge of the plate 15, and after a short, initial lowering of the pivotal connections 18 at the start of the swinging movement of the links 16, the links 16 will continue to move (clockwise in Figs. 1 and 3) from the position shown in full lines in Fig. 3 to the position shown in full lines in Fig. 1, which is approximately a half revolution. This movement of the links 16 will carry the forward edge of the die or press plate 15 upwardly so that this press plate will be disposed in a nearly upright position, as shown in Figs. 1 and 2, with the underface of the plate or die 15 nearly upstanding and facing forwardly, which would be to the left in Fig. 1, and in face view in Fig. 2. When the links are rotated in the opposite direction, that is counterclockwise, in Figs. 1 and 3, the front edge of the press plate 15 will be swung first forwardly and downwardly, and at the same time the rear edge will be cammed to the tracks 20. After the forward edge of the plate 15 has been fully lowered, which will be when the links 16 are depending vertically from the pivot pin 17, the continued rotation of links 16 in the same direction will carry the forward portion of the plate 15 up against the underface 13 of the press head 8. During this last elevation of the forward portion of the plate 15, it is also moved rearwardly and this cams the rear part of the plate 15 upwardly on the tracks 20 until it also abuts flat against the underface 13 of the press head 8. This places the plate 15 in horizontal pressing position against the underface of the press head.

The links 16 may be rotated in opposite directions in any suitable manner, but in the embodiment of the invention shown in Figs. 1-3, the track frame 21 is extended rearwardly and an air or low pressure hydraulic cylinder 22 is secured on cross bars 23 and 24 that connect opposite tracks 20. In this air cylinder is a piston connected to a rod 25 that extends from the lower end thereof and is hinged to the rear edge of the plate 15. The piston rod 25 reciprocates in a direction parallel to the tracks 20. Pipes 26 are connected to opposite ends of the air cylinder so as to convey compressed air or fluid under pressure to each end of the cylinder alternately and to release it from each end of the cylinder. This causes reciprocations of the rod 25. When air or fluid under pressure is admitted through the right-hand pipe 26 in Figs. 1 and 3, the piston rod 25 will be forced to the left, and this rod will move the rear part of the plate 15 downwardly and forwardly. During this movement the plate 15 will act as a connecting rod to the crank arms, represented by the links 16, and move the links 16 clockwise in Fig. 3. When air or fluid is released from the right-hand end of the cylinder 22 and compressed air or fluid is admitted to the left-hand end of the cylinder 22, the piston 25 will be moved to the right and will pull the plate 15 upwardly into the position shown in Fig. 3. During the descent of the rear end of the plate 15, the rollers 19 may engage against upstanding stops 27 provided on the forward ends of the tracks 20 to limit the movement of the plate 15 beyond the upstanding position shown in Figs. 1 and 2.

Also disposed along the inside face of each of the side plates 3 and 4 is a channel guide 28 which mounts a series of rollers 29. These channel guides extend forwardly and rearwardly beyond the side plates, and the rollers are arranged like roller bearings, at intervals from front to rear of the side plates and forwardly thereof, as shown in Fig. 1. The platen 9 lies between the channels 28, and the lower pressing plate or die 14 extends sidewise beyond the platen and overlies the rollers 29, so as to be slidingly supported thereby while the platen 9 is in its lower position. Preferably the platen 9 drops a small distance below the plate 14 when the plate 14 is resting on the rollers, in order that plate 14 may be rolled forwardly and rearwardly on the rollers without friction or interference from the platen. On the rearward extension of the channels 28 are cross bars 30 and 31, Fig. 1, which serve to connect the rear extensions of the channels 28 and also support another air cylinder 32 having air connections 33 to opposite ends thereof. The air or hydraulic cylinder 32 has an outwardly extending piston rod 35 which, at its forward end, carries a laterally extending pin 36 (Figs. 4 and 5). A pair of ears 37 extend rearwardly from the rear edge of the lower press plate or die 14, and these ears have downwardly opening notches 38, Fig. 3, which receive or telescope downwardly over the ends of pin 36 to form a detachable coupling between the lower press plate 14 and the piston rod 35.

The platen is never lifted except when the plate 14 is in its rearward position, and then as the plate 14 is lifted with the platen, the ears 37 move upwardly out of coupling engagement with the pin 36, as shown in Fig. 3. When the main ram descends and the platen lowers the press plate 14, the notches 38 will again receive the pin 36 and recouple the die plate 14 to the piston rod 35. By selectively admitting air or fluid to one end of the air cylinder 32 through pipe 33, while venting the opposite end, the lower die plate 14 may be shifted forwardly into the position shown in full lines in Fig. 1, where it is easily accessible for inspection and cleaning, removal, or ejection of molded parts, as well as for the mounting of inserts and the filling of its mold cavities with molding material. The lower die plate 14 may be retracted by the cylinder 32 into a position over the platen where it can be lifted off the rollers 29 and carried upwardly into a pressing position, as shown in Fig. 3.

In Fig. 6, the air cylinder used to shift the upper plate forwardly, is omitted and instead pivot shafts 17 are fixed to the links 16 and rotatably mounted in the frame. A gear 39 is fixed on each shaft 17 so as to rotate with the links 16. A rack bar 40 is mounted on each side plate for reciprocation, and meshes with the gear 39 on the same side of the press so that reciprocations of the rack bar 40 will rotate the links 16 between the positions shown in Fig. 1 and those shown in Fig. 3. The rack bars 40 may be operated in any suitable manner, such as by being coupled to an air or fluid motor 41, shown in Fig. 6.

In the modification of the invention shown in Figs. 8, 9 and 10, the construction is generally the same as for Figs. 1 to 7, but is applied to a two-opening mold press and is also provided with a different operation of the mold plate 14. Each gear 39 mounted on the shafts 17 moves through a little less than a half revolution in its travel from pressing position, shown in full lines in Fig. 8, to open position shown by dotted lines in the same figure. In this modification the rack and gear mechanism for moving the links 16 is also employed to operate the lower mold plate 14 into and out of molding position. For this purpose the racks 40 are extended and mesh with and operate pinions 42 that are fixed on shaft 43. Also fixed on shaft 43 is a gear 44 which meshes with rack teeth 45 on the lower face of the lower mold plate 14. The plate 14 is mounted to ride at its opposite margins upon rows of rollers 29, some being carried on brackets 28a fixed to the side plates. The pinions 42, shaft 43, gear 44 and rack teeth 45 replace the cylinder 32 of Figs. 1 to 7. The shaft 43 is mounted for rotation in the press frame, extends from side plate to side plate, and carries a pinion 42 and gear 44 at each end. When the cylinder 41 is operated to move rack 40 endwise, such as downwardly in Fig. 8, it rocks the links 16 into dotted line position, and at the same time it operates pinion 42 and gear 44, and through the gear 44 it operates on the rack teeth on the plate 14 to move the plate 14 outwardly on rollers 29 into position in front (or to rear) of the space between the side plates of the press where it is exposed for cleaning, servicing, fitting or removal of molded objects. When the rack bar 40 moves upwardly into the full line position shown in Fig. 8, it acts through pinions 42, gear 44, shaft 43 and rack teeth on the side face of plate 14 to drive the plate 14 back between the side plates 3 and 4 into pressing position. When the plate 14 is lifted by the upward movement by platen 9, the rack teeth on the lower face of plate 14 merely are lifted out of mesh with gears 44, and then when plate 14 is lowered again until it rests on rollers 29, the rack teeth on the side face settle down upon and again mesh with the gears 44. Also plate 15 of the lower opening of the press has a slot 38 similar to that shown in Fig. 5, which disengages from the pins 18 on the lower end of the arms 16 when the plate 15 is moved upwardly. When the press closes, the ram 1 pushes the platen 9 against lower plate 14, which engages the lower plate 15, intermediate press head 50, upper opening lower plate 14 and then upper plate 15.

When the press is returning to open position, the lowermost pair of plates 14 and 15 are moved bodily and horizontally to one face of the press (to the right in Fig. 8) and the uppermost of the plates 14 and 15 are moved bodily and horizontally to the other face of the press (to the left in Fig. 8), so that one operator could be stationed at one face of the press to service the die molds that move outwardly at his position, and another operator could be stationed at the opposite face of the press to service the molds that move outwardly at that position. In this type of two-opening press, the cylinder 41 for one pair of mold plates 14 and 15 will be located near the bottom of the frame with its rack bar 40 extending upwardly, as shown at the left side of the frame in Fig. 8, and the other cylinder 41 will be located near the top of the frame at the other side, or diagonally opposite corner, in Fig. 8, but with its rack bar 40 extending downwardly.

The operation of the press should be clear from the foregoing description, and it will be observed that the mechanism for mounting the die plates 14 and 15 is exceptionally simple and practical and serves to position the pressing faces of the dies 14 and 15 in very accessible positions for servicing, as shown in Figs. 1 and 2. The opening and closing may be relatively rapid, and the mechanism is compact, simple and inexpensive, and contains a minimum of parts that require frequent attention. The links 16 that support the front portion of the top pressing plate provide a relatively simple and practical means for guiding the front of the tilting plate in a circular arc, and the rollers on the back portion, while riding upon the downwardly and forwardly sloped or inclined tracks during at least an initial part of the opening operation, carry the upper plate 15 free of the pressing face of the press head and thus avoid any interference between plate 15 and the front, lower corner of the head or block 8. This makes it possible to use a minimum of daylight opening of the press, and the relatively minimum ram travel requires a minimum of hydraulic liquid in each cycle of operation.

It will be understood that various changes in the details and arrangements of parts, which have been herein described and illustrated in order to explain the nature of the invention, may be made by those skilled in the art within the principle and scope of the invention as expressed in the appended claims.

I claim:

1. A molding press having a frame, a press head, a ram, a platen below said head and raised and lowered by said ram, a pair of pressing plates disposed in said frame between said platen and press head, one of said plates being movable vertically with said platen in said frame into and out of face to face contact with the other plate, said one plate being also movable horizontally into and out of said frame when it is in its retracted position, links hinged to the front of the frame and to the forward edge of said other plate, depending downwardly and rearwardly when the upper face of said other plate abuts face to face against the pressing face of said press head, a trackway at each side of the frame for guiding the rear edge of said other plate downwardly and forwardly, and a power device connected to said other plate for operating it forwardly and rearwardly, whereby the links and trackways guide said other plate first downwardly and forwardly and then guide the forward edge of that plate upwardly to cause the under face of that plate to face forwardly.

2. A molding press having a frame, a press head, a ram, a platen below said head and raised and lowered by said ram, a pair of pressing plates disposed in said frame between said platen and press head, one of said plates being movable vertically with said platen in said frame into and out of face to face contact with the other plate, said one plate being also movable horizontally into and out of said frame when it is in its retracted position, links hinged to the front of the frame and to the forward edge of said other plate, depending downwardly and rearwardly when the upper face of said other plate abuts face to face against the pressing face of said press head, a trackway at each side of the frame for guiding the rear edge of said other plate downwardly and forwardly, a power device connected to said other plate for operating it forwardly and rearwardly, whereby the links and trackways guide said other plate first downwardly and forwardly and then guide the forward edge of that plate upwardly to cause the under face of that plate to face forwardly, and a power element carried by said frame and having a part operated thereby rearwardly and forwardly, said one plate having a cooperative part automatically interengaging with said part that is operated by said power element upon the descent of said one plate and disengaging therewith during ascent of said one plate, whereby said power element is operative to move said one plate out of said frame.

3. A molding press having a frame, a press head, a ram, a platen below said head and raised and lowered by said ram, a pair of pressing plates disposed in said frame between said platen and press head, one of said plates being movable vertically with said platen in said frame into and out of face to face contact with the other plate, said one plate being also movable horizontally into and out of said frame when it is in its retracted position, links hinged to the front of the frame and to the forward edge of said other plate, depending downwardly and rearwardly when the upper face of said other plate abuts face to face against the pressing face of said press head, a trackway at each side of the frame for guiding the rear edge of said other plate downwardly and forwardly, a rod hinged to the rear edge of said other plate for operating it forwardly and rearwardly, and a fluid operated motor connected to said rod for operating it back and forth.

4. In a molding press of the type having a frame, a press head, a platen movable towards and from said head, a pair of pressing plates disposed in said frame between said platen and head, with one plate movable with the platen toward and from the head, and the other abutting against the head, that improvement which comprises a pair of links, one at each side of said frame, adjacent said head, and rockable on the frame to swing forwardly and rearwardly, said links being also hinged to the forward portion of said other plate and extending rearwardly and downwardly when said other plate lies against said head, so as to guide the forward edge of said other plate first forwardly and then upwardly in a direction out of said frame, and guides carried by said frame adjacent to each side thereof, and supporting and guiding the rear portion of said other plate for forward and rearward travel, said guides having a downward and forward inclination from their rear ends.

5. In a molding press of the type having a frame, a press head, a platen movable towards and from said head, a pair of pressing plates disposed in said frame between said platen and head, with one plate movable with the platen toward and from the head, and the other abutting against the head, that improvement which comprises a pair of links, one at each side of said frame, adjacent said head, and rockable on the frame to swing forwardly and rearwardly, said links being also hinged to the forward portion of said other plate and extending downwardly and rearwardly at an inclination to the vertical when said other plate lies against said head so as to guide the forward edge of said other plate first downwardly and forwardly and then upwardly in a direction out of said frame, guides carried by said frame adjacent to each side thereof, and supporting and guiding the rear portion of said other plate for forward and rearward travel, said guides having a downward and forward inclination from their rear ends, and an operating rod hinged to said other plate for moving it forwardly and rearwardly.

6. In a molding press of the type having a frame, a press head, a platen movable towards and from said head, a pair of pressing plates disposed in said frame between said platen and head, with one plate movable with the platen toward and from the head, and the other abutting against the head, that improvement which comprises a pair of links, one at each side of said frame, adjacent said head, and rockable on the frame to swing forwardly and rearwardly, said links being also hinged to the forward portion of said other plate and extending rearwardly and downwardly when said other plate lies against said head, so as to guide the forward edge of said other plate first forwardly and downwardly and then upwardly in a direction out of said frame, guides carried by said frame adjacent to each side thereof and supporting and guiding the rear portion of said other plate for forward and rearward travel, said guides having a downward and forward inclination from their rear ends, and means for causing said links to rock, and said other plate to move back and forth forwardly and rearwardly.

7. In a molding press of the type having a frame, a press head, a platen movable towards and from said head, a pair of pressing plates disposed in said frame between said platen and head, with one plate movable with the platen toward and from the head, and the other abutting against the head, that improvement which comprises a pair of links, one at each side of said frame, adjacent said head, and rockable on the frame to swing forwardly and rearwardly, said links being also hinged to the forward portion of said other plate so as to guide the forward edge of said other plate first forwardly and downwardly and then upwardly in a direction out of said frame, and guides carried by said frame adjacent to each side thereof, and supporting and guiding the rear portion of said other plate forward and rearward travel, said guides having a downward and forward inclination from their rear ends, said links being inclined inwardly and rearwardly when said other plate is abutting said head, so that the forward edge of said other plate, when moving forwardly, will initially move downwardly and then upwardly, and the rear edge of that other plate will initially move downwardly and forwardly, to position the lower face of that other plate forwardly and upstanding.

8. The press substantially as set forth in claim 4, and a shaft mounted to rock on said frame and extending from side to side, said links being fixed on said shaft with said shaft constituting the rockable axis of said links, a gear fixed on said shaft, a rack meshing with said gear and operable endwise to operate said gear, and a motor coupled to said rack to impart endwise movement thereto.

9. The press substantially as set forth in claim 4 having a shaft on the ends of which said links are fixed, said shaft being rockably mounted on said frame, so that the links swing together with said shaft and provide the rockable mounting of the links, a gear fixed on said shaft to rock it on its axis, and a power device operable on said gear to impart to it rotary motion in alternate directions and swing said links and through them move said other plate into and out of said frame.

10. The press as set forth in claim 4, and a generally horizontal guide on which said one plate may rest when the platen is retracted and guiding said one plate laterally and horizontally into and out of a position within said frame and in front of said platen, said one plate carrying a row of rack teeth extending horizontally in the direction of its movement on said guide, a gear into and out of mesh with which said rack teeth move as said one plate rests on said guide or moves away from it, and a power operated device for rotating said gear to move said one plate laterally to one side of said frame after said platen has been retracted.

11. The press as set forth in claim 4, and a generally horizontally guide on which said one plate may rest when the platen is retracted and guiding said one plate laterally into and out of a position within said frame and in front of said platen, said one plate having a horizontal row of rack teeth extending in the direction of its movement on said guide, a gear into and out of mesh with which said rack teeth move as said one plate rests on said guide or moves away from it, a power operated device for rotating said gear to move said one plate laterally to one side of said frame after said platen has been retracted, and means also carried by the frame for moving said other plate also laterally to one side of the frame.

12. The press as set forth in claim 4, and a shaft rockably mounted on the frame and to the ends of which said links are fixed for movement together and constituting the rockable mounting of the links on the frame, and a power operated device connected to said shaft for rotating it in opposite directions.

13. The press as set forth in claim 4, and a shaft rockably mounted on the frame and to the ends of which said links are fixed for movement together and constituting the rockable mounting of the links on the frame, a gear fixed on said shaft, a rack bar mounted on said frame for endwise reciprocation and meshing with said gear to rotate it as it reciprocates, and a motor coupled to said rack bar to reciprocate it.

14. The press as set forth in claim 4, and a shaft rockably mounted on the frame and to the ends of which said links are fixed for movement together and constituting the rockable mounting of the links on the frame, a gear fixed on said shaft, a rack bar mounted on said frame for endwise reciprocation and meshing with said gear to rotate it as it reciprocates, and a motor coupled to said rack bar to reciprocate it, said frame having a support on which said one plate rests when said platen is retracted and on which it is guided for movement horizontally between a position over the platen and another position to the front of the frame, said one plate having forwardly and rearwardly extending rack teeth, and a gear rotatably carried by said frame and into mesh with which said row of rack teeth on said one plate moves when the platen reaches retracted position, and out of mesh with which it moves when said platen rises from retracted position, said rack bar having a driving connection to said second gear which meshes with said rack teeth on said one plate, whereby when said rack bar is operated while said platen is retracted it simultaneously moves said one plate laterally into exposed forward position and said other plate into an angular position largely outside the frame at the front thereof.

15. A molding press having a frame, a press head, a ram, a platen below said head and raised and lowered by said ram, a pair of pressing plates disposed in said frame between said platen and press head, one of said plates being movable vertically with said platen in said frame into and out of face to face contact with the other plate, said one plate also being movable horizontally into and out of said frame when it is in its retracted position, inclined tracks extending forwardly and rearwardly of the frame and supporting the rear part of said other plate for downward and forward movement all the way from its pressing position in which said other plate abuts said head, a pivotal support carried by said frame and pivotally connected to the forward part of said other plate, and guiding it forwardly and then upwardly as the rear part of said other plate moves forwardly and downwardly, so as to elevate the forward end of said other plate and expose its lower face forwardly when it is moved out of its pressing position against said head, the pivotal axis of said support remaining in the same positions on said frame while said other plate moves into and out of said frame, and a motion transmitting coupling between said plates for causing their said movement simultaneously out of said frame, and also simultaneously into said frame.

16. In a molding press of the type having a frame, a press head, a platen movable towards and from said head, a pair of pressing plates disposed in said frame between said platen and head, with one plate movable with the platen toward and from the head, and the other abutting against the head, that improvement which comprises a track guide at each side of the frame, supporting the rear portions of said other plate for forward and rearward travel, said guides having a downward and forward inclination from their rear ends for guiding the rear portion of said other plate at a downward inclination from the start of its forward movement, pivot means carried by said frame at approximately the front of said other plate and pivotally coupled to the sides of said other plate for guiding the forward portion of said other plate forwardly and upwardly while its rear portion moves downwardly and forwardly, the pivotal axis of said pivot means remaining in the same position on said frame as said other plate moves forwardly and rearwardly.

References Cited in the file of this patent

UNITED STATES PATENTS

| Number | Name | Date |
|---|---|---|
| 652,813 | Seiberling | July 3, 1900 |
| 1,332,963 | Tucker et al. | Mar. 9, 1920 |
| 1,567,766 | Stacy | Dec. 29, 1925 |
| 1,709,921 | Stacy | Apr. 23, 1929 |
| 1,778,803 | Hubbert | Oct. 21, 1930 |
| 1,800,849 | Stacy | Apr. 14, 1931 |
| 1,992,314 | Laussucq | Feb. 26, 1935 |
| 2,095,299 | Thweatt et al. | Oct. 12, 1937 |